(No Model.)  7 Sheets—Sheet 1.

W. BARRY.
MAIL MARKING MACHINE.

No. 511,745.  Patented Jan. 2, 1894.

Witnesses
C. C. Burding
H. E. Peck

Inventor
Wm Barry
per. O. E. Duffy
Attorney

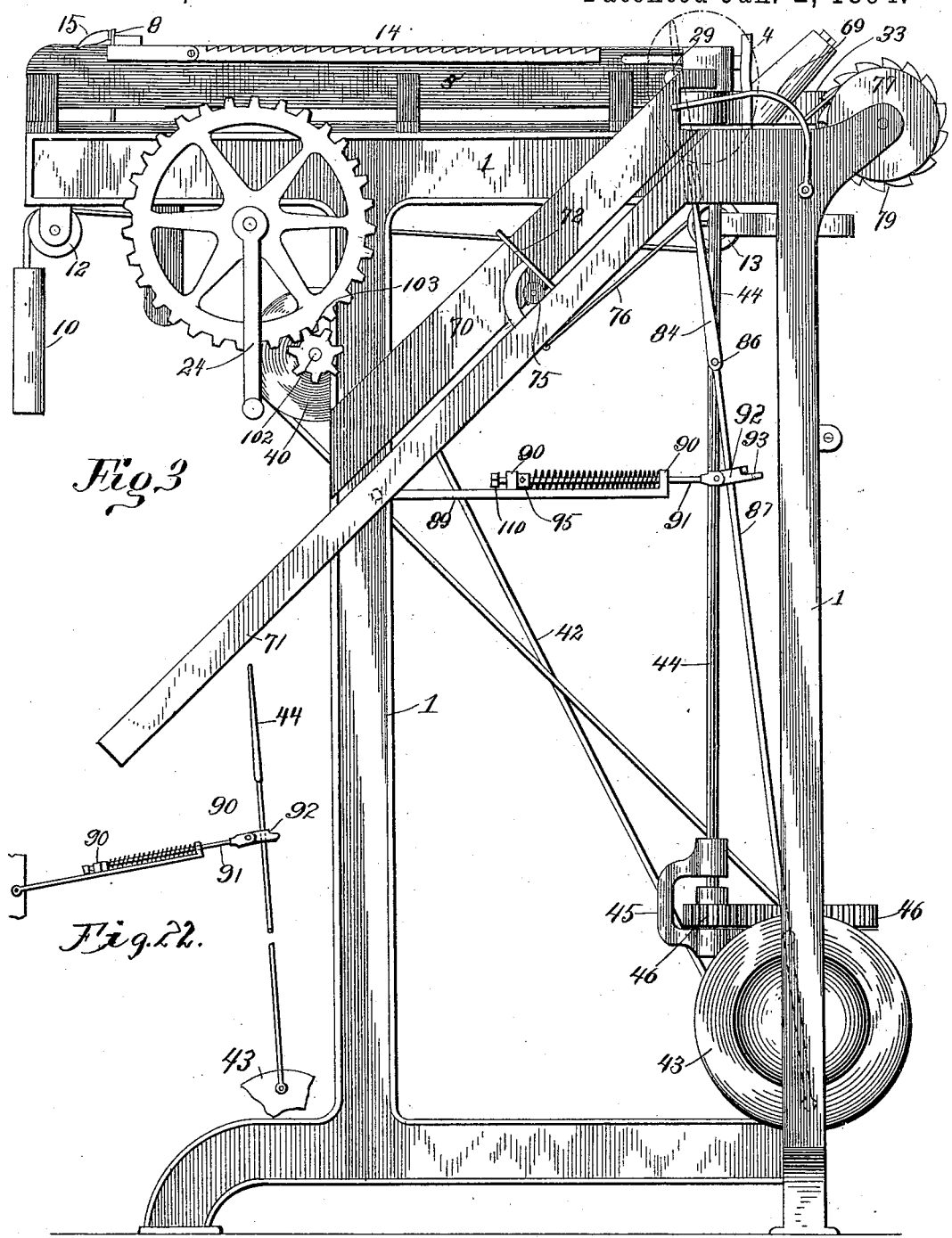

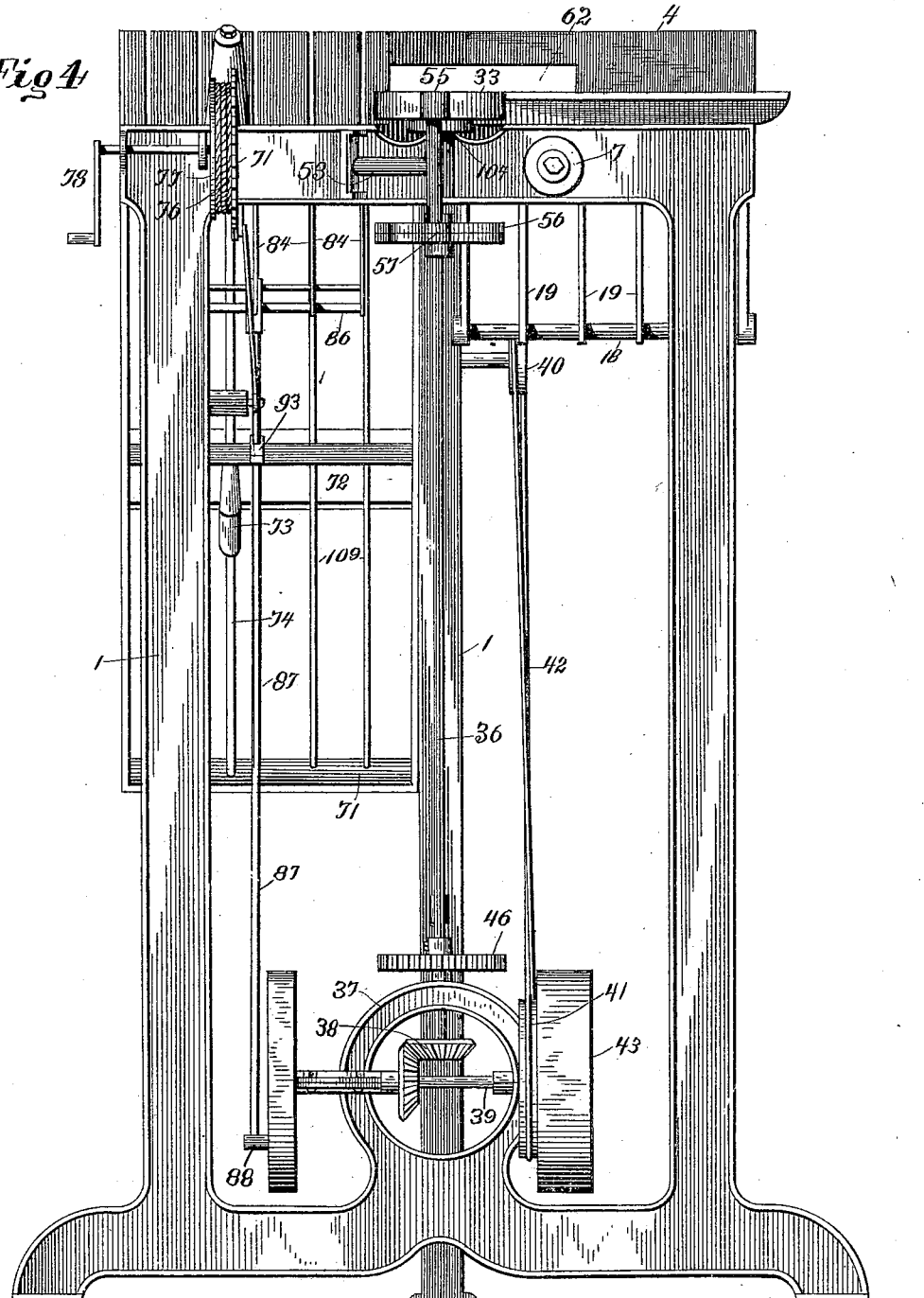

(No Model.) 7 Sheets—Sheet 5.

W. BARRY.
MAIL MARKING MACHINE.

No. 511,745. Patented Jan. 2, 1894.

Witnesses
C. C. Burdine
H. E. Peck

Inventor
Wm Barry
per O. E. Duffy
Attorney (No Model.) 7 Sheets—Sheet 6.
W. BARRY.
MAIL MARKING MACHINE.
No. 511,745. Patented Jan. 2, 1894.
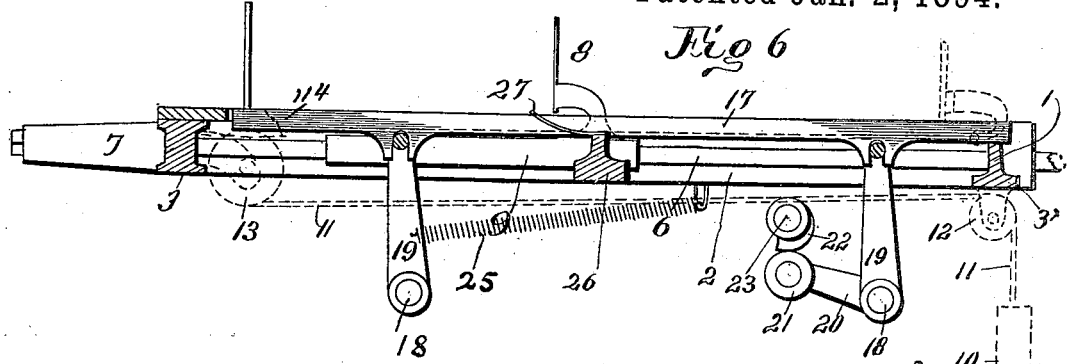
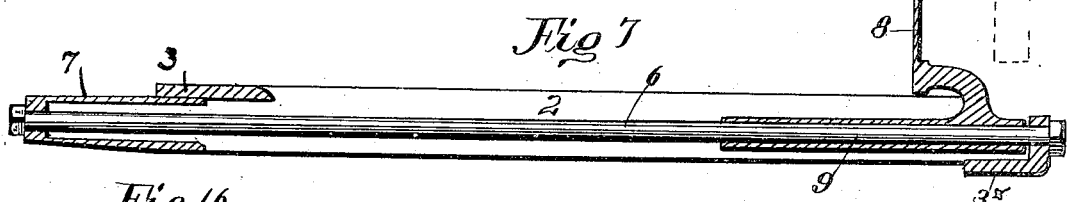
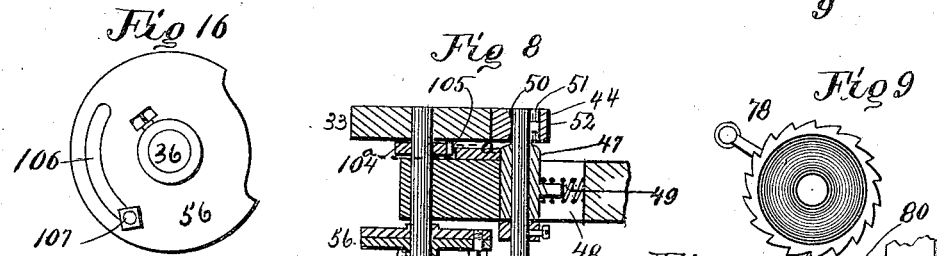
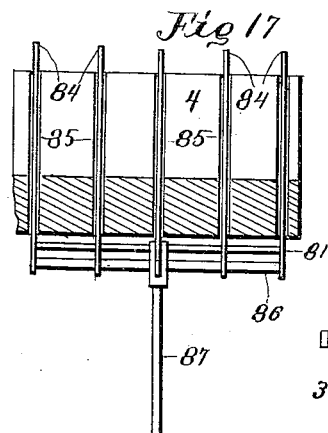
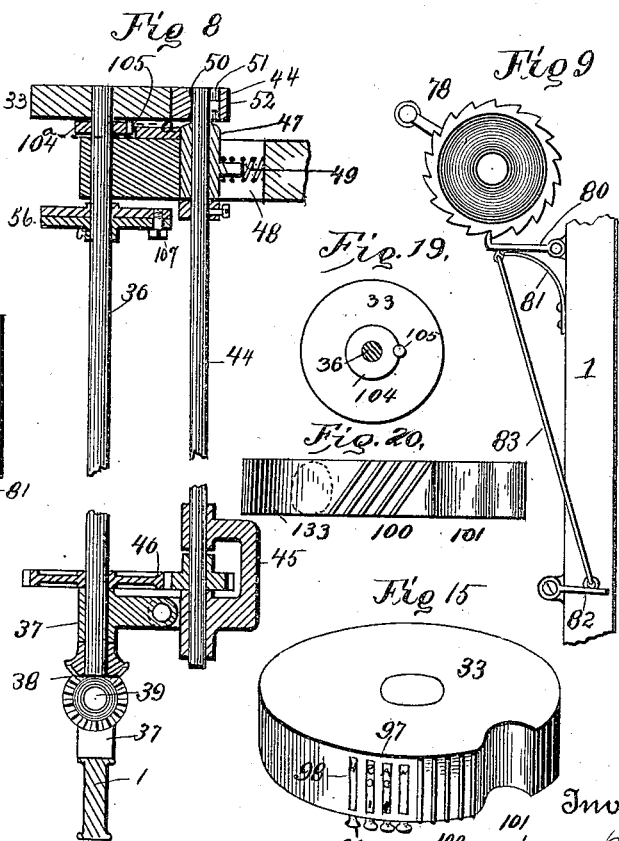
Witnesses
C. C. Burding
H. E. Peak
Inventor
Wm Barry
per O. E. Duffy
Attorney

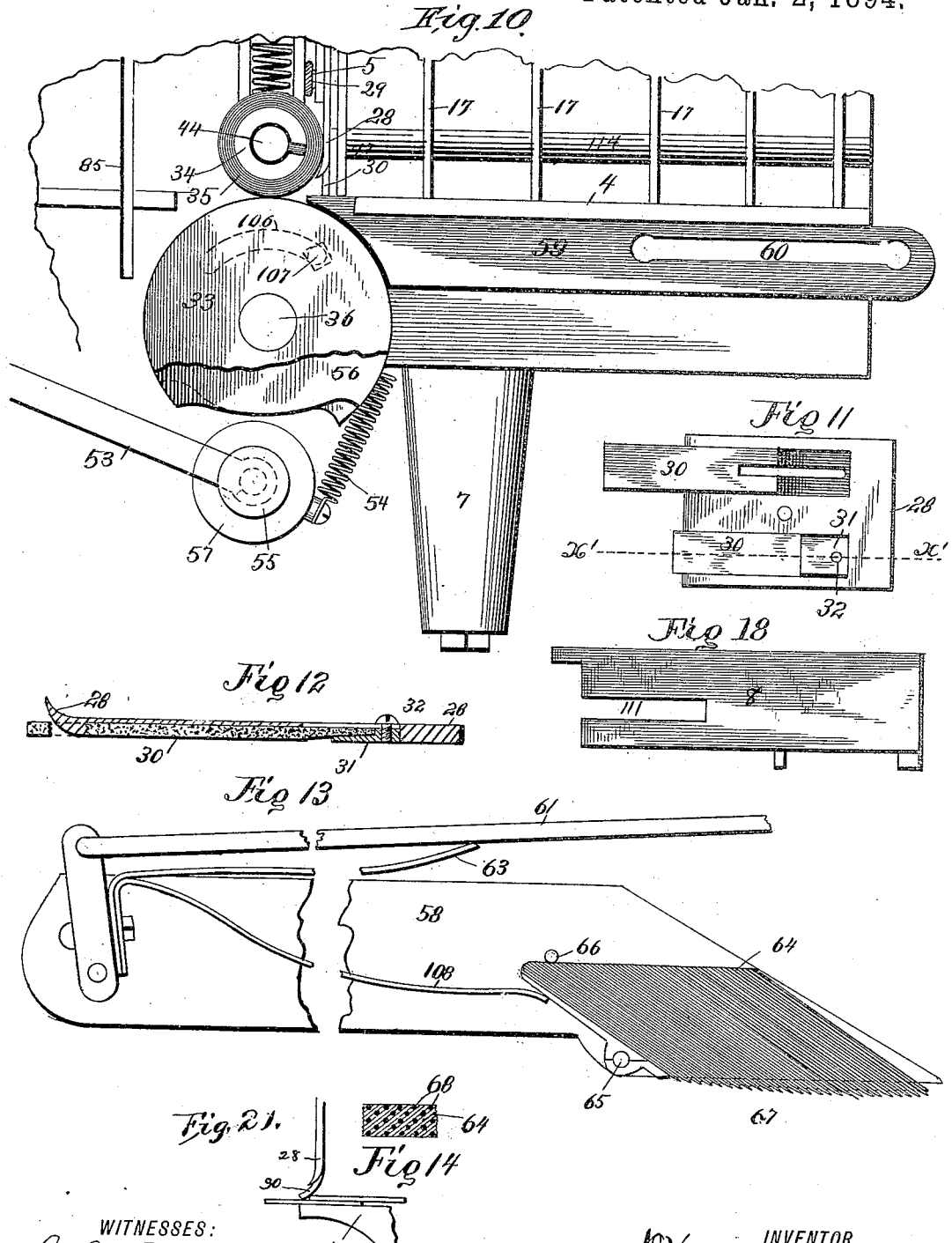

UNITED STATES PATENT OFFICE.

WILLIAM BARRY, OF SYRACUSE, NEW YORK.

MAIL-MARKING MACHINE.

SPECIFICATION forming part of Letters Patent No. 511,745, dated January 2, 1894.

Application filed March 26, 1891. Serial No. 386,538. (No model.)

*To all whom it may concern:*

Be it known that I, WILLIAM BARRY, of Syracuse, in the county of Onondaga and State of New York, have invented certain new and useful Improvements in Mail-Marking Machines; and I do hereby declare that the following is a full, clear, and exact description of the invention, which will enable others skilled in the art to which it appertains to make and use the same, reference being had to the accompanying drawings, and to the figures of reference marked thereon, which form part of this specification.

This invention relates to certain improvements in post-marking and stamp canceling machines.

The object of the invention is to provide an improved machine for automatically canceling stamps and post-marking mail matter, such as letters, newspapers, &c., simple in construction, automatic and certain in action and exceedingly sure and effective in operation.

The particular object is to provide such a machine, capable of receiving a large quantity of mail matter and automatically, without the attention of the operator, stamping the same, and then stacking, packing, or delivering the stamped mail in such a manner that it can be easily and quickly handled or distributed as it is taken from the machine, whereby the machine when filled with a large quantity of mail operates upon the same automatically without the attention of an attendant, thereby enabling one person to attend to several machines.

These and other objects are accomplished by and my invention consists in certain novel features of construction and in combinations of parts more fully described hereinafter and particularly pointed out in the claims.

Figure 1:
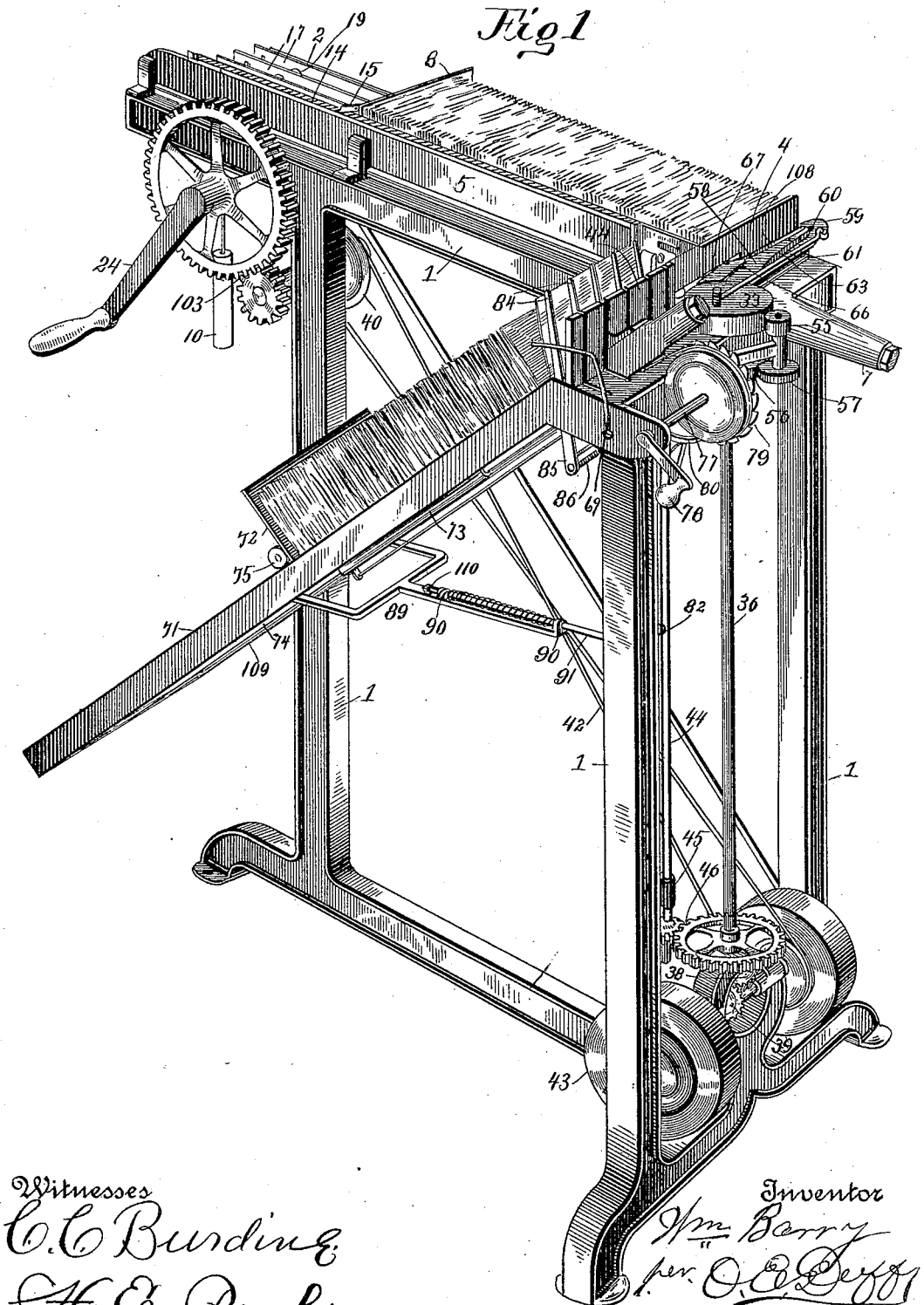
Figure 2:
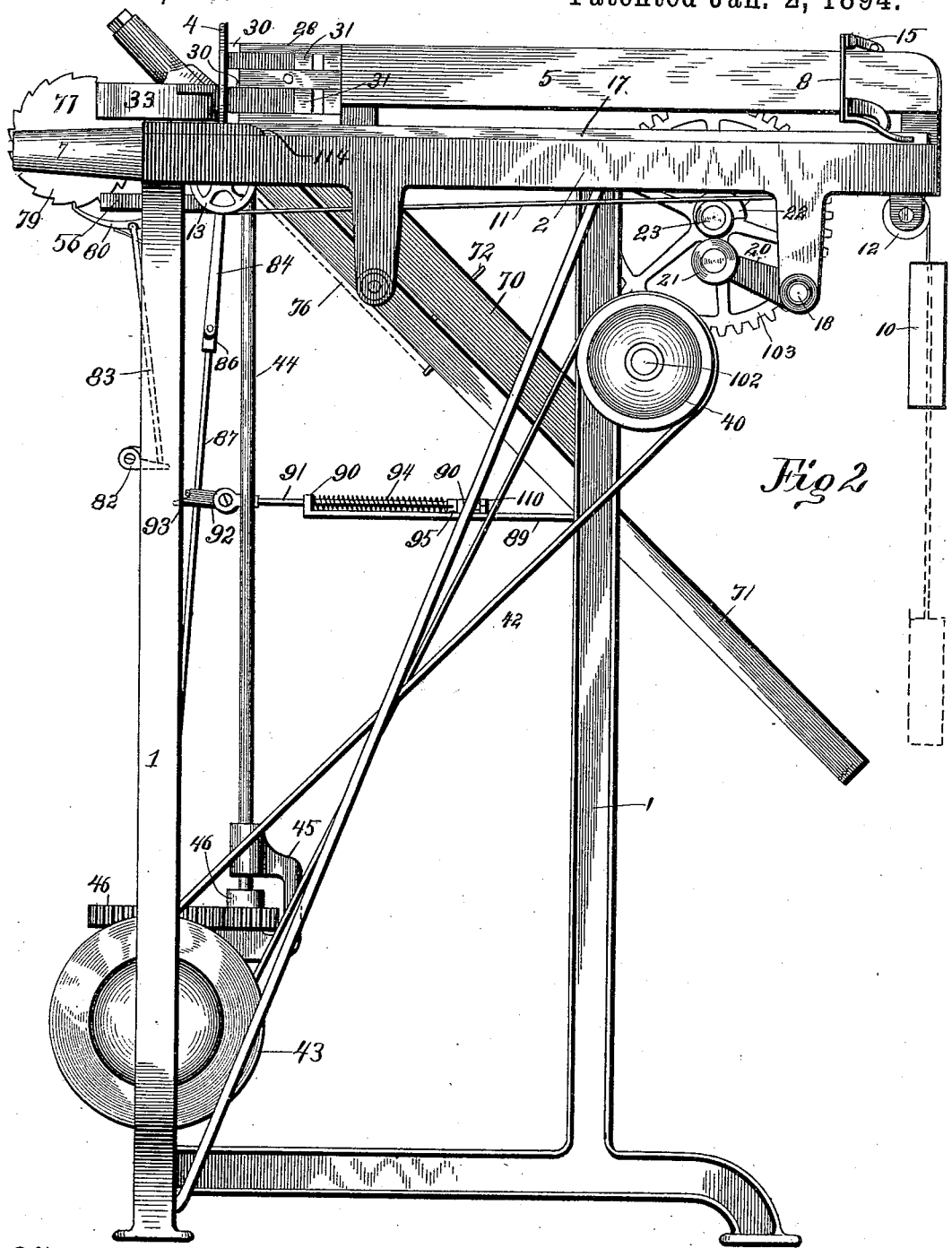

Referring to the drawings which illustrate the preferred construction of my invention, Figure 1, is a perspective of the machine as in operation. Fig. 2, is a side elevation from the feed bed or way side of the machine. Fig. 3, is an elevation from the opposite side, dotted lines indicating the path in which pressing fingers travel. Fig. 4, is an end elevation, the lateral feeder at discharge end of feed way not being shown. Fig. 5, is a top plan of the machine. Fig. 6, is a detail longitudinal section of the feed bed showing the feeding devices taken on line $z\ z$, Fig. 5. Fig. 7, is a sectional view showing the follower of the feed bed taken on line $x-x$, Fig. 5, the auxiliary feed bars not being shown. Fig. 8, is a detail vertical section taken in plane of line $y-y$, Fig. 5. Fig. 9, is a detail view of the spool carrying cord which controls movable base, bracket or support of receiving bed, and the controlling means of such spool and follower. Fig. 10, is a detail plan showing printing wheel and cam controlling inking device. Fig. 11, is a detail elevation of the adjustable removable plate, carrying flexible or elastic fingers to regulate the feeding of the letters from the feed bed to the printing wheel. Fig. 12, is a section of the same on the line $x'-x'$, Fig. 11. Fig. 13, is a detail plan of the feeding device which passes the letters or other articles laterally from the feed bed one by one, to the printing device. Fig. 14, is a cross section of a portion of the body having the letter engaging projections. Fig. 15, is a detail perspective of the printing wheel. Fig. 16, is a detail bottom plan of the adjustable cam controlling the inker for printing wheel. Fig. 17, is a detail section showing pressing fingers. Fig. 18, is a detail elevation of feed way follower. Fig. 19 is a section on line $a-a$, Fig. 8, looking up. Fig. 20 is an edge view of type and feed wheel showing a different arrangement of feeding and canceling ribs. Fig. 21, is a small detail plan view illustrating the friction fingers in the side discharge from the feed way, bent back by a letter passing through such passage and showing them in the act of holding back the next letter. Fig. 22, is a detail diagrammatical elevation showing the stacking fingers at their highest position with the connections controlling the same.

In the drawings 1, is the frame of the machine suitably supported by a base or legs.

The horizontal feed bed or way of the machine is located on one side thereof and, preferably, has the parallel rigid side pieces 2, 2, connected at one end by a rigid cross bar 3, and at the opposite end by a rigid portion $3^×$ of the frame. Vertical transverse wall 4, closes inner end of bed. The innermost letter in the bed abuts against such wall and is fed laterally therefrom to the stamping devices. A longitudinal horizontal guide plate 5, is located at the inner side of the bed against which the inner ends of the letters abut. This longitudinal guide 5, does not extend entirely to the inner transverse wall 4, of the bed, as hereinafter set forth.

A horizontal longitudinal rod 6, is rigidly secured beneath the feed bed (Figs. 5, 6 and 7), preferably, to the pieces or portions 3, and 3, of the frame. The one end (preferably the inner end) of this rod 6, is secured in the outer end of a socket 7, projected from the frame. The vertical follower 8, forms the outer end wall of this feed bed and extends transversely across the same and is rigid with the elongated horizontal sleeve or tube 9, fitted snugly and yet to freely slide the length of rod 6, so that the follower can move the entire length of the bed and directly up against the rigid inner end wall 4, as the end of tube 9, projects into socket 7, when follower is at inner end of bed. The follower is constantly drawn inward by means, such as weight 10, carried by flexible connection 11, working over pulley 12, at the outer end of the bed and thence extending longitudinally of the bed around pulley 13 at the opposite end thereof and then to the follower to which it is securely fastened, (Fig. 6.) By this means the follower is constantly drawn or pressed inwardly with a sufficient force to constantly press the mail matter inwardly against the rigid wall 4, but not with such great pressure as to pack the letters so that they cannot be easily and quickly fed to the printing or stamping devices. Of course, it is obvious that any suitable means can be employed to actuate this follower and constantly press the letters inwardly and hold them in the proper upright position, other than the follower and weight here shown.

The upper edge of the inner longitudinal guide or side 5 of the feed bed is provided with the rack 14, composed of ratchet teeth inclined toward the inner end of the feed bed; and the follower is provided with the loose dog 15, pivoted thereto which runs loosely over said rack when the follower is moved inwardly, but which prevents retrograde movements of the follower when feeding forward during the backward movements of the auxiliary feeding devices herein described. When it is desired to move the follower to the outer end of the feed bed this dog 15, is lifted from the rack and the follower is drawn back, thereby lifting the weight 10, so as to be in position to move the follower forward again.

The follower is held at the outer end of the feed bed by a suitable catch, such as 16, which can be readily and easily released from the follower when it is desired that the same should move or feed forward. A spring catch 16, is preferably employed which automatically catches and holds the follower when drawn entirely back.

The letters to be stamped are closely but loosely packed in a perpendicular position with the stamped ends inward and aligned by the inner longitudinal guide and with the stamps at the lower longitudinal edges of the letters, the stamped faces all toward the discharge end of way. The catch 16, holding the follower is then released, the follower pressing the letters against the inner rigid wall; but it has been found that where a large quantity of letters are to be fed, sufficient pressure to feed the body of letters from one end will cause too much pressure at the opposite end to allow ready lateral feeding of the letters when a portion of the letters is removed because of the varying weight and quantity of mail matter contained in the feed bed.

In order to provide a regular, constant and positive feed, unaffected by the amount of mail matter contained in the feed bed, a suitable auxiliary feeding device is provided, such as a feed bottom preferably composed of a series of longitudinal parallel feed bars 17, extending throughout the length, and forming the bottom of the feed bed. These bars are, preferably, although not necessarily, set up on edge so that the lower longitudinal edges of the letters or other mail matter rest upon the upper edges of these bars. These feed bars are given a comparatively slow longitudinal horizontal movement toward the inner or discharge end of the feed bed to carry the letters toward said end, and are returned in the opposite direction by a quick movement loosening the letters, but not carrying them back, by suitable mechanism, such as one or more horizontal transverse rock shafts 18, a distance below said feed bars and journaled in rigid portions of the frame of the machine, supporting said bars and moving the same by means of upwardly extending arms 19, rigid on the shaft or shafts and loosely joined to the feed bars so that a minimum up and down movement will be imparted to the feed bars when said shafts are rocked, each bar being preferably provided with a separate arm 19, to each shaft. A forward motion is imparted to the bars at the proper intervals by means of the lateral crank arm 20, rigid with one of said rock shafts 18, and having a roller 21, upon its outer end acted upon and forced downwardly by means of the cam 22, upon the drive shaft 23, mounted in suitable bearings of the frame, and in practice connected with the power or driving mechanism. In the present instance said shaft is provided with a hand crank 24. The engaging surface of the cam 22 gradually increases in height so as to give the feed bars a comparatively steady, slow and regular motion toward the discharge end of the feed bed, but this inclined edge of the cam terminates in an abrupt shoulder, so that when the feed bars have moved to feed the limit of their inner stroke they are quickly thrown back by the retractive spring 25, rigidly secured at one end and its opposite end secured to a lateral arm rigid with one of said rock shafts 18.

When an auxiliary feeding device is employed in the feed bed, the follower having a constant pressure toward the discharge of the bed serves to hold the letters together and in proper position, and against retrograde movement when the feed bars move backward, and impart to the letters a constant forward pressure; and when very few letters are left in the feed bed the follower does most of the feeding, holding the letters tightly against the wall at the discharge end of the bed, so that they can be readily grasped by the lateral feeding mechanism.

The movable floor of the feed bed in conjunction with the follower serves to feed the letters forwardly regularly and constantly, as is clearly evident.

A cross bar 26, located beneath the feed bed is provided with a series of spring arms 27, which extend up between the feed bars with their upper ends tending to spring above the plane of the upper edges of said bars. These springs extend toward the discharge end of the feed bed, so that when the bed contains mail matter the spring will press up against the lower edges of the letters and allow them to move toward the discharge end of the bed, but will prevent their retrograde movement. These springs are not absolutely necessary. Hence, I do not limit myself to their use, as the follower accomplishes substantially the same purpose, but where feed bed is of great length they are used as auxiliary to followers. Where these spring fingers are employed it is not necessary to provide the follower with the ratchet mechanism before described, as the fingers will hold the letters against backward movement when the movable floor of the feed bed moves backward.

Suitable mechanism is provided at the discharge end of the feed bed to separately carry the letters to a suitable stamping or printing mechanism. A suitable mechanism takes the letters separately as they come from the stamping mechanism and packs them in the receiving way or bed in a parallel and upright position, so that they can be readily taken therefrom and distributed.

The transverse vertical wall 4, at the discharge end of the feed bed is extended laterally to the opposite side of the machine and a lateral space is left between the inner longitudinal side 5 of the feed bed and this wall.

At the inner end of the inner side of the feed bed a vertical plate 28, is removably secured by suitable means, such as screw 29, so that the inner beveled edge of this plate leaves a narrow vertical space between it and the wall 4, through which the letters are separately fed to the printing mechanism. This space is limited and more than one letter is prevented from passing through the same at one time by means of flexible or elastic strips or fingers 30, secured to plate 28 and projecting across said space. These strips are bent in against beveled edge of the plate and press the letter tightly in against wall 4, and prevent more than one letter entering such space, and hold the letter passing through same in proper position. These friction fingers 30, project transversely across the lateral discharge passage in the same direction that the letters are fed forward in the feed way, so that the free ends of the fingers engage and rub along the rear face of the letter as fed through the passage and are thereby bent in toward the outer end of the passage contracting size of passage and engaging end edge of and holding back the next letter or letters behind the letter started through such passage. The fingers permit passage of letters of greatly varied thicknesses, but hold back to overcome tendency of next letter to move laterally with letter moved by the lateral feeder. Each strip 30, is located in a groove in the plate 28, and at its inner end is held by a clamping piece 31, held by screw 32, extending through a slot in the plate, so that as the ends of the strips wear the strips can be moved outwardly, so that proper tension will always be exerted upon the letters as they pass into the printing mechanism.

The printing wheel or roller 33, is arranged vertically at the outer side of the wall 4, with the inner side of its periphery projecting through a slot or opening 62, in such wall at the outer side of the lateral discharge from the feed bed. The periphery of this roller is provided with suitable type to cancel and stamp the envelopes, the operating mechanism for the roller and the type being, preferably, so arranged that the roller will print once every revolution. A friction pressure roller 34, is located on the inner side of the wall 4 and outer side of the lateral discharge from the feed bed with its periphery, preferably, covered with rubber, flexible material or the like 35, and constantly pressing against the periphery of the printing wheel with a yielding pressure, so that the inner end of each letter as it passes from the discharge over the feed bed is caught by said friction or feed and printing rollers and is drawn between the same and stamped.

In Fig. 15, the printing wheel 33, is shown in detail provided with any suitable type 97, secured in and projecting slightly beyond the periphery of the wheel by any suitable means, such as slots 98, in wheel to receive the type and an adjusting screw 99 for each slot, to clamp the type therein. This type is intended to print the place and date. In advance of this type the periphery of the wheel is provided with a series of, preferably, parallel, transverse ribs 100, which cancel the stamp and also assist the feed roll in gripping the letter and carrying the same through the printing mechanism. These ribs can be suitably formed integral with or secured on the periphery of the printing wheel in a vertical (Fig. 15) or diagonal position (Fig. 20). A recess 101, preferably rounded or beveled, is formed radially and transversely in the periphery of the printing roller to receive the end of each letter as passed to said roller and avoid jar and prevent said end being bent or twisted; the end of the letter entering said recess and then being immediately caught and drawn through as the rollers rotate. This recess 101, extends completely across the periphery of the roller, as shown, so that there is nothing to strike and bend and double the thin end of letter.

I do not limit myself to the peculiar means carried by the roller for printing and canceling, nor do I limit myself to any peculiar manner of securing type.

The printing wheel is mounted upon upper end of the vertical shaft 36, at its lower end extending through a bracket 37, and provided with beveled gearing 38, connecting it to horizontal shaft 39, extending through said bracket and at one end connected with a shaft 102, parallel with and driven from shaft 23, by properly proportioned gearing 103 by means of pulleys 40 and 41, and belt 42, and provided with a weighted fly wheel 43. Of course I do not limit myself to the peculiar gearing here described, as any suitable gearing can be employed. The friction roller 34 is mounted upon the upper end of vertical shaft 44, at its lower end journaled in bracket 45, hinged to the bracket 37, so as to allow the friction wheel and its shaft to move toward and from the printing wheel and its shaft; gearing 46, rotating the friction wheel shaft from and in the opposite direction to the printing wheel shaft, also rotating said friction wheel shaft at a proper corresponding or proportional speed. The upper end of shaft 44, is mounted in a box 47, movable in a slot 48, in the frame to allow the movement of the friction wheel toward or from the printing roller by spring 49. The printing wheel 33, is loose on its shaft 36, and rests on a collar 104 rigid on said shaft, and the wheel is locked to rotate with the shaft by a pin 105, rigid with the printing wheel and extending into a recess or aperture in collar 104. See Figs. 8 and 19. By means of this construction the printing wheel can be easily and quickly lifted off at any time to change or adjust type or for other reasons.

The friction roller is provided with the bore 50, flared or tapered outwardly at each end and with a vertical slot 51, in which a lateral pin 52, rigid with the shaft fits, so as to rotate the wheel with the shaft and allow easy removal of roller and horizontal rocking of the friction roller independent of its shaft, so that the periphery of the friction roller will always remain parallel with that of the printing roller, as the shaft carrying the friction roller swings back and forth.

A suitable inking attachment is provided for the type wheel or printing roller consisting of horizontal swinging arm or bracket 53, pivoted to the frame at one end and constantly drawn in toward the printing roller by spring 54, and provided opposite the periphery of said printing roller with the rotary inking pad 55, adapted to engage the printing roller only once and that when the type of the roller comes opposite to the inking pad, so that the pad will not engage the roller at any point except that provided with the type. This is accomplished by means of the cam 56, on the printing roller shaft beneath the printing roller and engaging the roller 57, of the swinging bracket carrying the pad. This cam 56, is constructed in two similar sections (see Fig. 8) the upper section being loose or rotatable on shaft 36 and resting on the lower section which is rigidly secured to the shaft. A segmental slot 106, is formed in lower section through which set or clamping screw 107 extends and screws into the upper section, thereby adjustably clamping the two cam sections together. By this means the periphery of cam can be varied so that the time or place of engagement between inker 55, and wheel 33, can be varied (see Fig. 16).

Suitable mechanism is provided for feeding the letters separately from the discharge end of the feed bed into the stamping device, this mechanism preferably consisting of the reciprocating feed plate 58, sliding on bearing surface 59 (Fig. 10) behind and parallel with wall 4, and confined thereon by a lug extending into slot 60. This plate is reciprocated at the proper intervals by operating means, such as the pitman 61, journaled at one end, preferably to the outer end of plate 38, and at the other end journaled or pivotally united to the face of printing wheel 33, at a suitable distance from the center thereof to give the pitman the proper throw. A slot 62, is formed in the wall 4, so that the projections or biting surface of the feeder can project therethrough and bite into the face of the first letter and force the same laterally through the discharge opening. The free end of the feed plate extends to and into such slot, and is yieldingly forced thereinto during its forward stroke and allowed to swing out therefrom during its downward stroke by means of a long spring 63, at one end secured to the feed plate near its pivoted end and from thence extending forwardly and bearing on pitman 61, so that as the printing wheel rotates to bring the pitman around on the inner side thereof the feed plate is drawn forward and said spring is pressed in, thereby pressing in the free end of the feed plate and as the pitman finishes its forward stroke, it swings away from and relieves the spring, thereby allowing free end of the reciprocating feed plate to swing out from engagement with the letter as the feeder is drawn back. The biting or engaging means of this feeder preferably consists of a block or holder 64, removably pivoted at its outer end at 65, to allow its inner engaging edge to swing toward or from the letters, and provided with a stop 66, to limit its inward swing, and a spring 108 to yieldingly press it inward through slot 62, in wall 4. The inner edge of this block is provided with toothed surface or projections 67, inclined in the direction the letters are to be moved so as to only engage and move the letters in that direction. This feeder is, preferably, composed of a plurality of needles or other sharp or needle pointed pins, wires or the like, 68, lying parallel and inclined as shown and all united by casting or otherwise forming the block or holder 64, around them with their sharp ends all projecting from the inner edge thereof, as shown in Figs. 13 and 14. Such a feeder as this possesses many and great advantages, and will engage and force along the most highly glazed and polished paper surface, and cannot slip, but furnishes a most sure and positive feed, while the universal yielding mounting of the feeder and its plate causes the feeder to carry the letters along easily and readily and without choking or clogging. The swinging and yielding movement of the lateral feeder and its controlling spring causes the reciprocating plate to throw its free end from the letters at back stroke, thereby freeing the letter when caught by feed and type rolls and disengaging needle points therefrom, hence preventing undue wear thereof. During its forward stroke the springs cause the feeder to yieldingly engage and press against the letter with sufficient pressure to enable the needle points to carry the same along, the springs causing the needle points to project through slot 62, and engage letter, even if not pressed directly against wall 4. The swinging, yielding movement of holder having needle points is also a feature of great advantage, as where uneven surfaces are engaged, also insuring perfect feed and engaging and disengaging of same without friction or wear on points, and easily and readily. The type roll and feed roll are geared to have equal peripheral speed which is greater than the forward or reciprocating speed of the lateral feeder and its needle points, so that as soon as a letter is caught by said rolls it is drawn quickly away from and off of said points, without wear on points or tearing of letter. This lateral feeder passes the letters to the rolls without injuring exterior or contents thereof, and by reason of the yielding pressure of the rolls the contents of letters are uninjured. The follower 8, has a horizontal slot 111, corresponding to slot 62, so that when said follower is up against the wall the needle points of the reciprocating feed bar can project through said slot 62, and slot in follower. The rigid portion of the frame or cross bar 3, at discharge end of feed way is slotted to receive ends of bars 17, and the upper face of this rigid part 3, is smooth and substantially flush with the upper faces or edges of such bars 17, so that the lower edges of the letters at the extreme inner end rest on such rigid portion and can easily and readily move thereon. The elongated block or holder having the plurality of feed points at its longitudinal edge is pivoted at its outer end and provided with a spring constantly pressing in its inner end and edge so that the outer end of the inner edge will reach in through wall 4, and surely grip the letter at its inner end which is often thin and flexible, and will hold, support and force said thin end through the lateral passage past the friction fingers, for otherwise said thin end might double and bend upon engaging such fingers. As the letter is fed forward the feed block rocks so that almost its entire longitudinal edge engages the letter.

Great and most important advantages are attained by employing the plurality and multiplicity of closely arranged needle points, as the points are so close together that they cannot tear, scratch or deface the envelope or wrapper, yet they positively and firmly hold and feed the same, constituting a most sure and accurate feeder. Of course one or more feed plates can be employed. The outer edge of said rigid portion is beveled down as shown at 114 Figs. 2, 6 and 10 so that the letters can pass said edge without catching or hanging. The needle points longitudinally of block 64, are arranged convexly, that is the inner edge of block 64, is convexed. This insures all points engaging letter, particularly the center points. As the letters are shot out from between the feed and printing rollers they fly across the upper end of the receiver in front of wall 4, (which preferably extends completely across machine,) until their outer ends strike the spring stop 69; consisting of a spring wire or arm, which tends to throw the letters back against the inner longitudinal guide wall 70 of the receiver or receiving bed allowing them to fall one on the other in regular order, and all facing up. This receiver is, preferably, inclined downwardly as shown, and is composed of a suitable rigid frame 71, secured to or forming a part of the machine frame, and preferably, on the opposite side of the machine from the feed bed or way and in a vertical plane parallel therewith, although such arrangement is discretionary and the invention is by no means limited to it. The bottom or floor of the receiver is preferably (although not necessarily) composed of a series of parallel longitudinal rods 109 as shown, upon which the lower longitudinal edges of the letters rest and slide, whereby there is a minimum amount of friction and no sticking. The letters passed into the receiver are supported by the movable base plate or support 72, constructed in a suitable manner, preferably, substantially similar to the follower of the feed bed, and is mounted on an elongated tube 73, sliding on the rigid rod 74, beneath and parallel with the floor or bed of the receiver. This base plate can be provided with rollers 75, traveling on the side pieces of the receiver bed to reduce friction. This movable base plate 72, is controlled and operated by flexible connection 76, secured thereto and extending up through wall 4, to vertical windlass 77, upon which the cord is wound and to which it is secured. This windlass has a handle 78, by which it can be rotated to wind the flexible connection 76 thereon and draw up the base plate, and is provided with ratchet wheel 79, and pawl 80, which hold the spool and base plate. This pawl is, preferably, on the under side of wheel 79, and is provided with a spring 81 which yieldingly holds it in engagement with wheel. A small lever 82, is at one end journaled to a portion of the frame a distance below the spool, and its free end is connected to free end of pawl 80, by connection 83, so that when lever 82 is momentarily depressed, pawl 80, will be released from the ratchet spool, thereby allowing the same to rotate one tooth, and the base plate to slide down by gravity. As every letter is discharged from the printing device, it is caught by a pressure mechanism or device which presses it down in position upon the pile of letters already in the receiver, and when the space between the base plate and upper end of receiver is sufficiently full, this pressure device automatically operates the controlling means of the base plate and allows such plate to drop a certain distance, so that the base plate has a step by step downward movement to accommodate the letters as they are received. This pressure device, preferably, consists of a series of connected swinging and rising and falling fingers 84, confined and working in slots 85, in the wall 4, and upper end of receiver bed as clearly shown. As soon as a letter is discharged from the printing device these fingers move up and forwardly through the slots in wall 4, behind the letter and catch the letter and press it down on the pile of delivered letters and then slide down beneath the receiver bottom and then move up and rearwardly to slots in wall 4, to receive the next letter. These fingers consist of a series of vertical parallel metal strips at their lower ends secured to horizontal transverse head 86, rigid on the upper end of a vertical rod, lever or pitman 87, at its lower end pivoted to outer end of crank 88, on shaft 39. The movement of the fingers as before described is accomplished by this crank and pitman. A swinging hanger or bracket 89, is pivoted to frame of receiver, and is provided with an arm extending toward the pitman 87, and provided with perforated ears 90. A rod 91, passes loosely through these ears, and at its outer end is pivoted to allow vertical swing to a block 92, secured to the pitman and having toe 93, projecting laterally from the other side thereof, thus forming movable fulcrum for lever or pitman 87. The rod 91 has stop nut 110 on outer end. An expansive coil spring 94, of proper tension surrounds rod 91, and at one end bears against an ear 90, and at other end bears against a stop 95, on said rod, so as to constantly draw said rod and the pitman so as to yieldingly pull the pressing fingers toward the pile of letters in the receiver. This swinging bracket and spring connection guide and partially control the movements of the fingers. When the pile of letters in the receiver reaches up above the limit of outward or forward movement of the pressing fingers, of course they prevent the said fingers moving forward their full stroke and hold back said fingers while the down movement thereof begins, thereby contracting the flexible spring connections with swing bracket 89, causing the pitman to descend so that toe 93, engages and presses down lever 82, which is opposite same at middle of its stroke, thereby releasing pawl 80, and allowing the spool upholding base plate of receiver to rotate one tooth and thus drop or feed down base plate. The pressing fingers and pitman when operating in their normal path when the receiver is not full, carry the toe 93, so that it does not engage lever 82. The pressing fingers or devices thus control or feed down the base plate of the receiver. When the spool unwinds the base plate supporting connection, the letters and base plate slide down by reason of their weight. If more desirable the receiver can be arranged horizontally and provided with a movable bottom or bed such as used in the feed way, the pressure device being employed with a suitable weight actuated base plate or support to hold the letters in position. The fingers 30, on account of their elastic or flexible nature allow letters of all thicknesses to pass between their ends and the vertical wall, and by reason of their adhesive or frictional nature, retard the progress of all letters or packages excepting the inner one, when in contact with the inclined toothed surface of the propeller or lateral feed.

From the foregoing description and the drawings it will be understood that a machine of any capacity can be constructed, and the feed way filled with letters from inner wall to follower, all the letters having their stamped faces toward the discharge opening, and the stamped corners forming the inner lower corners of the letters, the follower is then released and the machine set in operation. The letters are picked one by one from the discharge end of the way and carried laterally by the reciprocating feeder to the printing and friction rollers through which they are drawn and by which they are stamped and then thrown into the upper end of the receiver, where they are caught by pressing device and formed into a proper stack or pile and pressed down, and the stack or pile is fed down in the receiver step by step as it increases, so as to leave room for the reception of letters as they separately come from the printing device. This arrangement insures the proper stacking of letters in the most convenient position to be speedily handled and distributed without injury to surface or contents thereof and regardless of dimensions of same.

The operating mechanism of all the various parts and mechanisms which operate upon the letters are so arranged and constructed, and proportionately geared as to operate such parts and mechanisms in the proper order and sequence.

As the feed and receiving ways are open letters of any size or dimensions can be received and stamped.

The great advantages of this machine are obvious. When the feed way is once filled and the machine started, it requires no more attention until all of the letters have been stamped. The stamped letters are all packed in regular order and all facing in the same way so that they can be quickly and readily handled and delivered and sorted. The follower of the feed way holds the body of the letters loosely against the discharge end of the feed way with a constant pressure holding them together and in the proper position, and with the feed bottom carries up the letters as their bulk or number decreases. The arrangement of feeding devices in the feed way move the body of letters forwardly at a sufficiently rapid speed to always present and hold a letter against the toothed feed plate or bar, but without creating a pressure or friction sufficient to retard the separate longitudinal movement of the letters to the feed and printing rollers.

The description herein is exceedingly specific and full, but it is so formed to fully explain the construction shown, and I do not limit myself thereby to such construction, for it is evident that various changes and modifications might be made in the forms, arrangements and constructions of the various parts described without departing from the spirit and scope of my invention. Hence I do not limit myself to the construction herein shown and specifically set forth, but

What I claim is—

1. In a mail stamping machine, the combination of a feed way provided with means to feed the body of letters forwardly, a printing mechanism, a feeder arranged to take the letters separately from the discharge end of said way into said printer, a receiver into which the letters from said printer are discharged, and a presser and stacker vertically and laterally movable to stack the letters together and in order in said receiver, substantially as described.

2. The combination with printing mechanism, of a receiving way into one end of which the letters are separately passed in an upright position, and a series of upright fingers located and operating in the receiving end of such way and provided with operating and controlling means, arranged to give the fingers a vertical and horizontal swing, and for the purpose set forth.

3. In a mail stamping mechanism, the combination with a printing mechanism of a receiving way into one end of which the letters are received, a stacker consisting of a series of upright fingers arranged to catch and press the letters in the way, a drive shaft, connections between said fingers and the shaft to impart a vertical movement to the fingers, and a yielding intermediate fulcrum by which a horizontal swing is imparted to the fingers and they can yield as the pile of letters in the way increases.

4. A mail stamping machine having a feed way provided with a longitudinally movable feed bottom and controlling mechanism arranged to impart to the bottom a gradual forward feeding movement and a quick return movement to carry the letters forward but not back.

5. A mail stamping machine having a feed way provided with a longitudinally movable bottom composed of a series of longitudinal parallel bars, and means to reciprocate the bars longitudinally, substantially as described.

6. A letter bed in a mail stamper having a differential longitudinally reciprocating movement to feed the letters forward but not carry them back and a follower pressing the letters forward loosely together.

7. A mail stamper having a feed way provided with a longitudinal guide a feed bottom composed of the parallel longitudinally movable rods upon which the letters rest, and means to hold the letters in position and together while being fed.

8. A mail stamper having a letter bed provided with a longitudinally reciprocating feed bottom, and means, substantially as described to prevent retrograde movement of the letters, substantially as described.

9. In a mail stamper, a letter way having a bottom composed of longitudinally reciprocating feed bars on which the lower edges of the letters rest.

10. In a mail stamper, the combination of the longitudinal feed bars forming the bottom of the letter way, rock shafts having vertical arms to which said bars are pivoted and by which they are reciprocated, a cam constructed to gradually move said bars forward to feed and to allow the same to quickly return, and a spring for returning the bars.

11. In a mail stamper, a letter way having a longitudinal aligning guide, a forwardly movable follower to constantly press and hold the letters loosely together as they move forwardly, and a feeding means other than said follower to feed the letters forwardly in said way, substantially as described.

12. In a letter way of a mail stamper, the combination of the longitudinally reciprocating feed bottom, a follower provided with means for pressing it forward to press and hold the letters loosely together, and a pawl and ratchet mechanism to prevent retrograde movement of the follower.

13. A letter way of a mail stamper having the longitudinally reciprocating feed bottom and the fingers projecting up through the floor of the way and pointing toward the discharge end of the way.

14. In combination, a feed way of a mail stamping mechanism having a longitudinal guide for the mail, a rod longitudinally beneath the way, and a follower in the way, composed of the vertical transverse plate mounted on a tube on said rod.

15. In combination, a feed way, a guide rod longitudinally beneath the same having a projecting end mounted in an extended socket beyond the wall at one end of the way, and a follower mounted on a tube on said rod so that the follower can move up to the wall with the tube entering said socket.

16. The feed way having a rigid wall at its inner end, and the side discharge opening in front of said wall, the feeding mechanism to press the letters against said wall, a follower in said way to maintain the letters loosely in the upright position, a printer at said opening and means to feed the letters separately through said opening to the printer.

17. In a mail stamper, the combination of the feed way having a lateral discharge and closed end, means to carry the letters to said end, printing mechanism, the horizontal reciprocating laterally movable feed plate, a pitman to reciprocate said plate, a spring controlling the lateral swing of the plate, the block pivoted at one end to said plate, having a biting surface to engage letters and yieldingly pressed in toward the letters.

18. In a mail stamper, the combination of the feed way having a side discharge opening, the reciprocating feed plate at the end of said way, means to reciprocate the same, the horizontal feed block pivoted at one end on said plate so that its inner biting surface engages the first letter in the feed way, and a spring pressing in the free end of the block so that one end of the biting surface will first engage the letter.

19. In a mail stamper, the combination of a horizontal feed way provided with a movable feed bottom, means to loosely maintain the letters in the upright position, said way having a side discharge at its front end, printing mechanism at said discharge, and a feeder at the inner end of said way, arranged to carry the letters separately from the way to the printing mechanism.

20. In a mail stamper, the combination of a feed way, a receiving way, a cross bar and vertical wall extending across the ends of both ways, the printing mechanism between said ways in front of said wall and above said cross bar, both ways having side openings to said printing mechanism, and a reciprocating feeder behind said wall and arranged to project through the same to feed the letters separately from the feed way.

21. In a mail stamper, the combination of a letter way, a printing wheel, a reciprocating feeder to carry the letters from said way to the printing wheel, and a pitman directly connecting the printing wheel and feeder to reciprocate the feeder, substantially as described.

22. The feed way having a side discharge opening, in combination with a transversely reciprocating plate at the end of the way provided with a pivoted block having a biting surface to engage the letters in the way, the points of said biting surface inclined toward said side discharge, substantially as described.

23. The feed way, in combination with a lateral feeder at the discharge end thereof consisting of the horizontal reciprocating plate having a lateral swinging movement, and a pivoted block at the free end of the plate, having a biting surface to engage and feed the letters, a spring controlling the movement of the block, a pitman reciprocating the plate, and a spring on the plate bearing against the pitman.

24. The feed way, having a slotted wall at its inner end, in combination with a reciprocating plate, carrying a biting surface and extended through said slot to feed the letters from the way, a spring controlling the swing of said plate, means for operating said plate controlling said spring, and arranged to throw the plate away from said wall at the back throw of the plate.

25. The printing mechanism in the mail stamper comprising a shaft having a printing wheel, and another shaft mounted to swing laterally toward said printing wheel shaft, and having a vertical wheel on its upper end rotated with and rocking independently thereof, a spring yieldingly pressing the vertical wheel against the printing wheel and driving means.

26. In a mail stamper, a printing mechanism consisting of a vertical shaft carrying a vertically arranged printing wheel, a vertical shaft driven by said printing wheel shaft and mounted in a bracket at its lower end so that the upper end of said shaft swings toward the printing wheel, the upper bearing box of said shaft moving in a horizontal slot and provided with a spring pressing it toward the printing wheel shaft, and a vertical rocking friction wheel on said swinging shaft.

27. In a mail stamper, the combination of a horizontal rotating printing wheel, the vertical shaft carrying the same, a feed wheel yieldingly engaging the periphery of the printing wheel and having a flexible and lasting cover, and the shaft carrying said feed wheel and capable of lateral swing said feed wheel loosely mounted on the upper end of the shaft to rotate therewith and rock vertically independently thereof so that the feed and printing wheels are maintained parallel.

28. In a mail canceling machine, the combination of a receiving way, having a movable support, the support therein mechanism controlling the movements thereof and a presser and stacker arranged to catch the letters as discharged into the receiving way, and pack the same in said way upon the support, said pressing device being arranged and constructed to control and actuate said controlling mechanism of the said support so as to move the support downwardly as the receiving way is filled.

29. In a mail stamper, the combination of a feed way, a receiving way, an interposed printing mechanism, means to feed the letters laterally from the feed way to the printing mechanism which discharges the same laterally into the end of the receiving way, a stacker and presser in said end of the receiving way consisting of a series of fingers having up and down, and back and forth movements arranged to catch the letters as discharged into said way and press the same into position, and then to move down and up to catch the next letter.

30. In a mail canceling machine, the receiving way into one side of the upper end of which the letters are fed in the upright position, in combination with a spring stop at the opposite side of said upper end of the receiving way against which the letters strike and the movable stacking fingers which press each letter toward the outer end of the way after it has been arrested by said stop.

31. In a mail canceling machine, the receiving way, the series of pressing fingers which catch the letters as discharged into said way and stack the same, the pitman to which said fingers are secured a shaft to which the lower end of said pitman is eccentrically secured and a movable fulcrum between the ends of said pitman whereby the fingers are given back and forth and rise and fall motion, as and for the purpose as set forth.

32. In a mail canceling machine, the combination of a receiving way, the support having a constant tendency to move toward the outer end of said way, connections normally holding said support, a spool upon which the same is wound, the pawl and ratchet mechanism holding said spool, the pressing fingers and operating mechanism therefor, so arranged and constructed that when the receiving way is filled to a certain point said operating mechanism will actuate said pawl and ratchet mechanism and allow the spool to rotate and permit outward movement of the follower such as and for the purpose as set forth.

33. In a mail canceling machine, the combination of a receiving way, a follower therein, the spool and connection controlling the follower, pawl and ratchet mechanism normally holding said spool, the lever or pitman connected with the drive shaft at one end and its outer end provided with a pressing finger or device, the swinging spring or extensible connection forming intermediate pivotal point or fulcrum for said pitman, and a toe or projection arranged to release said pawl and ratchet mechanism when the spring connection is extended, arranged and combined to operate, substantially as described.

34. In a mail canceling machine, in combination, the downwardly inclined receiving way, a movable supporting plate therein upon which the letters rest, a windlass provided with connections for up holding said plate, the holding pawl and ratchet mechanism, means, substantially as described, to automatically release the pawl and ratchet mechanism and to allow said plate to descend by gravity step by step as the receiving way is filled with letters.

35. In a mail canceler, in combination the rotary type or printing wheel, an impression wheel bearing thereon, the movable shaft carrying said impression wheel, a radial pin from said shaft, said impression wheel being removable and having its bore flared outwardly at each end and having a longitudinal slot receiving such pins.

36. In a mail canceler, the combination of a vertical shaft having a rigid collar near upper end, and a vertical type wheel removable on the upper end of said shaft and resting on said collar and having a projection engaging the recess or aperture in said collar whereby the wheel is held to rotate with th shaft, and can be easily lifted off of the shaft.

37. The feed bed, having a lateral discharge and movable feed bottom and a smoothed beveled rigid portion at its discharge end on which the letters rest, in combination with a lateral feeder.

38. In a mail stamper, the combination of a letter way having the end side discharge opening, the vertical end wall and the end floor or cross bar, printing mechanism at said opening, means, substantially as described, to carry the letters to said wall, the elastic friction fingers extending across said opening to said wall, and the transversely reciprocating feeder arranged to engage each letter and separately carry it along said floor and support it by said fingers until grasped by the printing mechanism.

39. In a mail stamper, the combination of a letter way having a side discharge opening and an end wall, printing mechanism at said opening, the elastic friction fingers extending horizontally across said opening, means to press the letters toward said wall, and a transversely reciprocating feeder at the end of the way having a throw extending beyond said fingers to the printing mechanism so that the feeder draws the letters by said fingers and unto the printing mechanism, substantially as described.

40. In a mail stamper, the combination of a letter way having an end wall and a side opening in front of said wall, printing mechanism at said opening, the elastic function fingers extending across said opening toward said wall, said wall having a horizontal slot or opening extending beyond said fingers, and the transversely reciprocating feeder having a path of reciprocation extending from said way to a point beyond said fingers so that the feeder extends through said slot and grasps the letters and draws them through the fingers into the printing mechanism, substantially as described.

41. The mail stamping machine having the transversely reciprocating feed block having a biting surface to grasp the letters and pivoted at one end so that the free end of said surface grasps the letter first at one end and draws the letter into the printing mechanism.

42. In a mail stamper, the combination of a letter way having a side discharge opening, the separating means at said opening to permit the passage of one letter at a time, and the transversely movable feeder arranged to enter said way at the end of the inner longitudinal side thereof and to move through and beyond said separating means so as to grasp the inner ends of the letters and draw them through the separating means.

43. In a mail stamper, the combination of a letter way having a side discharge opening at one end, and the transversely reciprocating feeder at said end having the biting surface, said block being pivoted to swing laterally and provided with a spring pressing its inner end inwardly so that the inner end of said surface first grasps the inner end of the letter and draws the letter through the opening.

44. In a mail stamper, the feeder composed of a sliding laterally movable spring controlled plate carrying a laterally movable spring controlled block having a biting surface, substantially as described.

45. The mail stamper having the letter way with a side discharge opening through its inner longitudinal side to the printing mechanism and provided with the transversely reciprocating feeder having a path of movement from the inner longitudinal edges of said way to the printing mechanism so that the feeder grasps the inner end of the letter, substantially as described.

46. A mail stamper having its letter way provided with a vertical end wall and a vertical inner longitudinal side wall leaving a side discharge opening between said walls, and a plate secured to said side wall adjustably carrying horizontal elastic friction fingers extending across said opening to the end wall.

47. A mail stamper having a letter way provided with a side discharge opening, and horizontal elastic friction fingers extending across said opening and adjustably held in grooves by clamping plates, and screws passing through slots.

48. A feeder composed of a body having a biting surface formed by a multiplicity of closely arranged short needle points all projecting in the same direction so that the letters will be firmly grasped without being punctured or defaced by said surface.

49. The feeder composed of a plurality of parallel needles or wires having sharp needle points and a carrier holding the same so that the closely arranged points form a biting surface, the multiplicity of close points preventing puncturing, substantially as described.

50. The feeder composed of a plurality of parallel closely arranged needles or wires having needle points, and a holder or carrier therefor such as a body of metal cast around the same so that the close points form one side thereof.

51. The feeder having its biting edge composed of a plurality of short projecting needle points so that the letters will be firmly grasped thereby without puncturing or tearing, substantially as described.

52. In a mail stamper, the combination with an impression wheel, of the constantly rotating printing wheel having the vertical depression extending across its surface to receive the edge of the letter, the printing characters and the printing ribs between said characters and said depression.

53. In a mail stamper, the combination of a feed way having feeding means, the printing mechanism, means to feed the letters thereto, a receiving way inclined downwardly from said printing mechanism, stacking means in said way, and a support for the letters in said way controlled in its downward movement by said stacker.

54. In a mail stamper, the combination of a feed way having a follower to loosely maintain the letters in the upright position and a reciprocating floor to move the letters forward, a receiving way, interposed printing mechanism, and means, substantially as described to separately feed the letters from said feed way into the printing mechanism which discharges them into the receiving way.

In testimony that I claim the foregoing as my own I affix my signature in presence of two witnesses.

WILLIAM BARRY.

Witnesses:
O. E. DUFFY,
HUBERT E. PECK.